United States Patent
Malcangio et al.

(10) Patent No.: US 10,599,786 B1
(45) Date of Patent: Mar. 24, 2020

(54) DYNAMIC TRANSLATION

(71) Applicant: ServiceNow, Inc., Santa Clara, CA (US)

(72) Inventors: Michael Dominic Malcangio, San Diego, CA (US); Jebakumar Mathuram Santhosm Swvigaradoss, Kutkatpally (IN); Ankit Goel, Hyderabad (IN); Rajesh Voleti, Hyderabad (IN); Srikar Bakka, Hyderabad (IN); Deepak Garg, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/370,226

(22) Filed: Mar. 29, 2019

Related U.S. Application Data

(60) Provisional application No. 62/820,679, filed on Mar. 19, 2019.

(51) Int. Cl.
*G06F 17/28* (2006.01)
*G10L 15/30* (2013.01)

(52) U.S. Cl.
CPC ............ *G06F 17/289* (2013.01); *G10L 15/30* (2013.01)

(58) Field of Classification Search
CPC .......................... G06F 17/289; G06F 17/2854
USPC ............................................................. 704/7
See application file for complete search history.

(56) References Cited

U.S. PATENT DOCUMENTS

| | | | |
|---|---|---|---|
| 2007/0180143 A1* | 8/2007 | Greeff | G06F 17/289 709/246 |
| 2010/0332214 A1* | 12/2010 | Shpalter | G06F 17/2854 704/2 |
| 2018/0052832 A1* | 2/2018 | Anglin | G06F 17/289 |
| 2019/0294684 A1* | 9/2019 | Joo | G06F 17/289 |

* cited by examiner

*Primary Examiner* — Bharatkumar S Shah
(74) *Attorney, Agent, or Firm* — Fletcher Yoder PC

(57) ABSTRACT

The present disclosure relates generally to dynamic translation of text and/or audio data. The client instance hosted by one or more data centers and accessible by one or more remote client networks. In accordance with the present approach, a translation request is received from a user via a client device, wherein the translation request is associated with an untranslated file and a target language. Further, a source language of the untranslated file is identified. Further still, the untranslated file and the target language are outputted to a third party translation service. Even further, a translated file based on the target language, the untranslated file and a source language of the untranslated file is received.

19 Claims, 8 Drawing Sheets

DYNAMIC TRANSLATION

CROSS REFERENCE TO RELATED APPLICATIONS

This application claims priority from and the benefit of U.S. Provisional Application Ser. No. 62/820,679, entitled "DYNAMIC TRANSLATION," filed Mar. 19, 2019, which is herein incorporated by reference in its entirety for all purposes.

BACKGROUND

The present disclosure relates generally to dynamic translation of text and/or audio of certain assets of an enterprise.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions. As organizations conduct operations globally they may have employees and/or customers that speak different languages. It may be expensive to have documents stored in the databases for every language, and further, communication between members of the organization may be inefficient due to language differences.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present techniques generally relate to dynamically translating text and/or audio with limited or minimal input from a user. For example, a user may wish to access certain documents stored in a database, and the documents may include text and/or audio in a language different than a preferred language of the user. As such, the present techniques may facilitate dissemination of the documents by identifying the source language of the documents, which may be tagged to the documents, and identifying a target language, such as the preferred language of the user, based on identity data associated with the user. For example, the target language may be identified based on a location of the user, a locale sent along with a request for the documents, user input indicating a preferred language, and the like. In any case, the text and/or audio of the document may be output via a client instance to a third-party translation service along with the target language, and in some embodiments, the source language. Then, the client instance may receive a translated document from the third-party translation service, such as translated text and/or audio with a voice over and/or subtitles. In some embodiments, the translated document may be output to a reviewer tasked with verifying the quality of the translation. In any case, the present techniques may facilitate efficient translation of information, such as certain documents, files, communication between employees and/or customers, which may improve the performance of an enterprise.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 7 shows a screenshot of a request form having fields with actionable content that may provide a translation of text within an associated field, in accordance with aspects of the present disclosure; and FIG. 8 shows an additional screenshot of the service form with a pop-up window indicating the translation of the text within a field, in accordance with aspects of the present disclosure.

DETAILED DESCRIPTION

Figure 1:
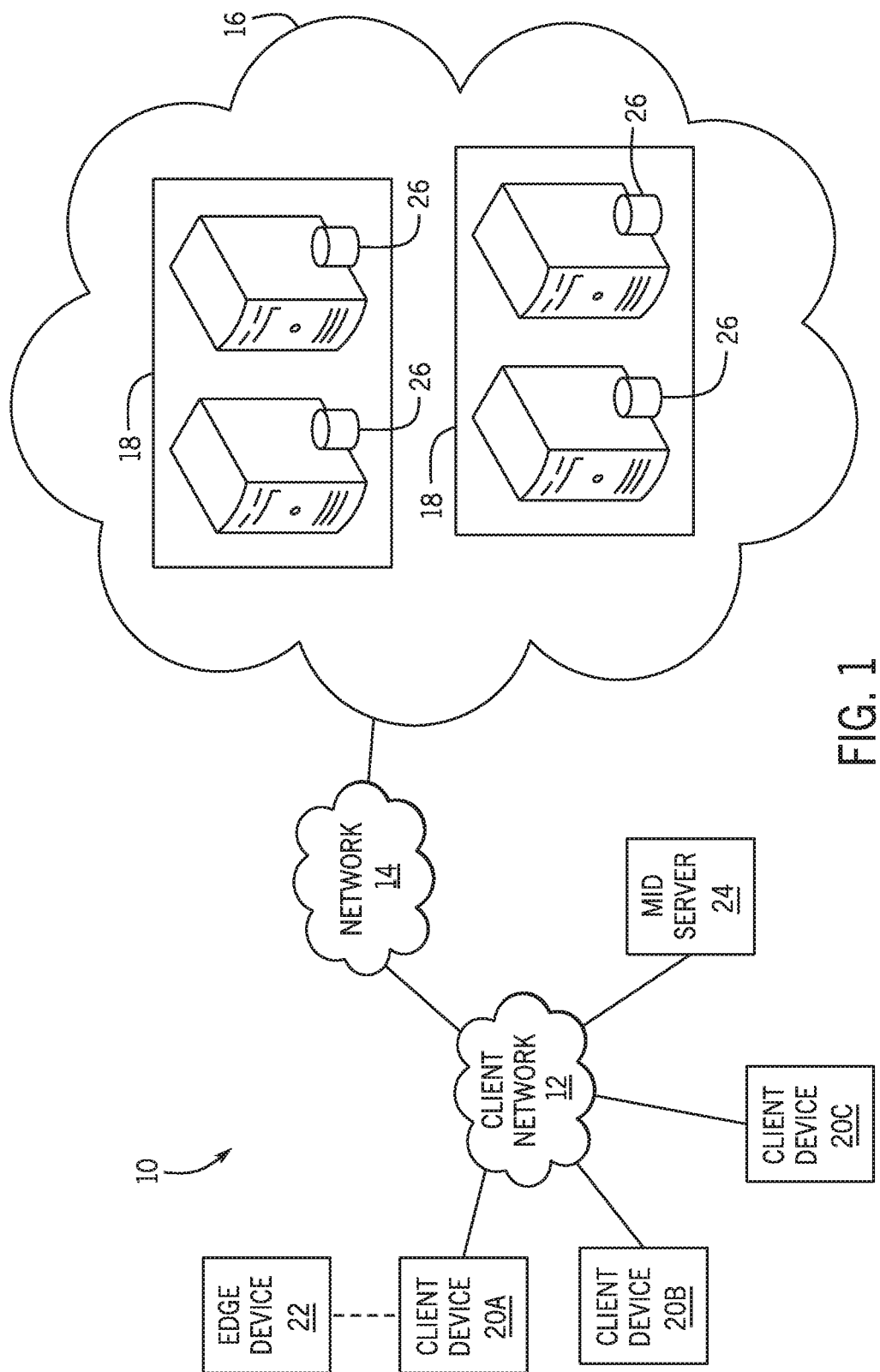
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

An enterprise may have employees and/or customers that speak different languages and, as such, the enterprise may employ certain translation services to facilitate communication between the employees and/or customers. Current translation services may be suitable for providing translations of static text present in labels and certain documents. However, current translation services do not efficiently translate dynamic text from certain assets, such as knowledge block (KB) articles and videos, and/or certain operations, such as queries and interactions with customer service agents. As used herein, "static text" refers to stored text values, such as text in labels. "Dynamic text" refers to text that may be displayed in fields that is updated or changed based on, for example, a user provided input, text pulled from a database, or generally an outside source.

The present approach is generally directed to techniques for translating dynamic text to facilitate communication between employees and/or customers as well as the dissemination of assets to the employees and/or customers. In certain embodiments, a user may utilize a translation feature that interfaces with an application and a translation service to translate dynamic text. For example, in a text-based conversation between a first and second employee, the translation feature may receive text message from a first employee via a first client device. Additionally, the translation feature may determine a source language based on a locale associated with client device and/or the first employee, and a target language based on a locale associated with a second device of the second employee. Then, the translation feature may output the text, the source language, and the target language to a translation service, and subsequently receive a translated text and output the translated text to the second client device. In some embodiments, the translation feature may receive audio data as an input to provide translations of dynamic text for video having audio. In some embodiments, a user may provide an input related to a desired third-party translation service that may be better suited for a certain language. In some embodiments, translated dynamic text may be routed to a reviewer or verifier who may verify the quality of the translation before it is sent.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
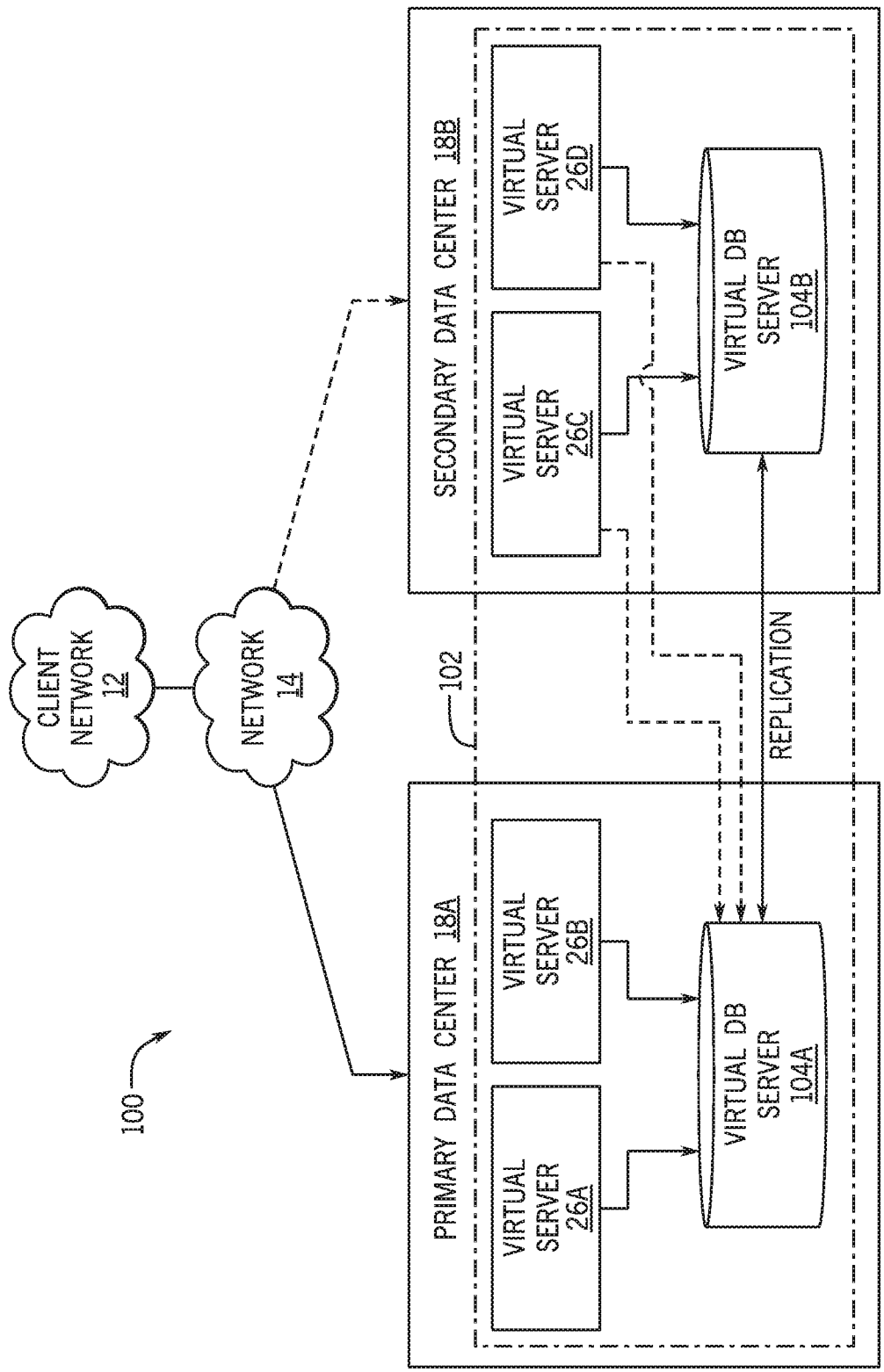
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
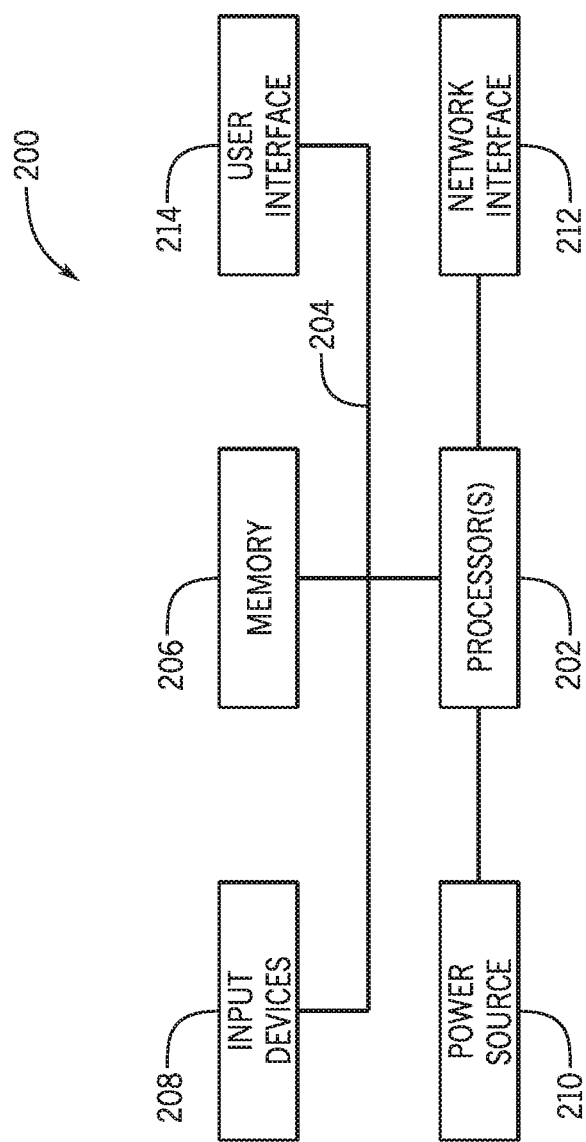
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
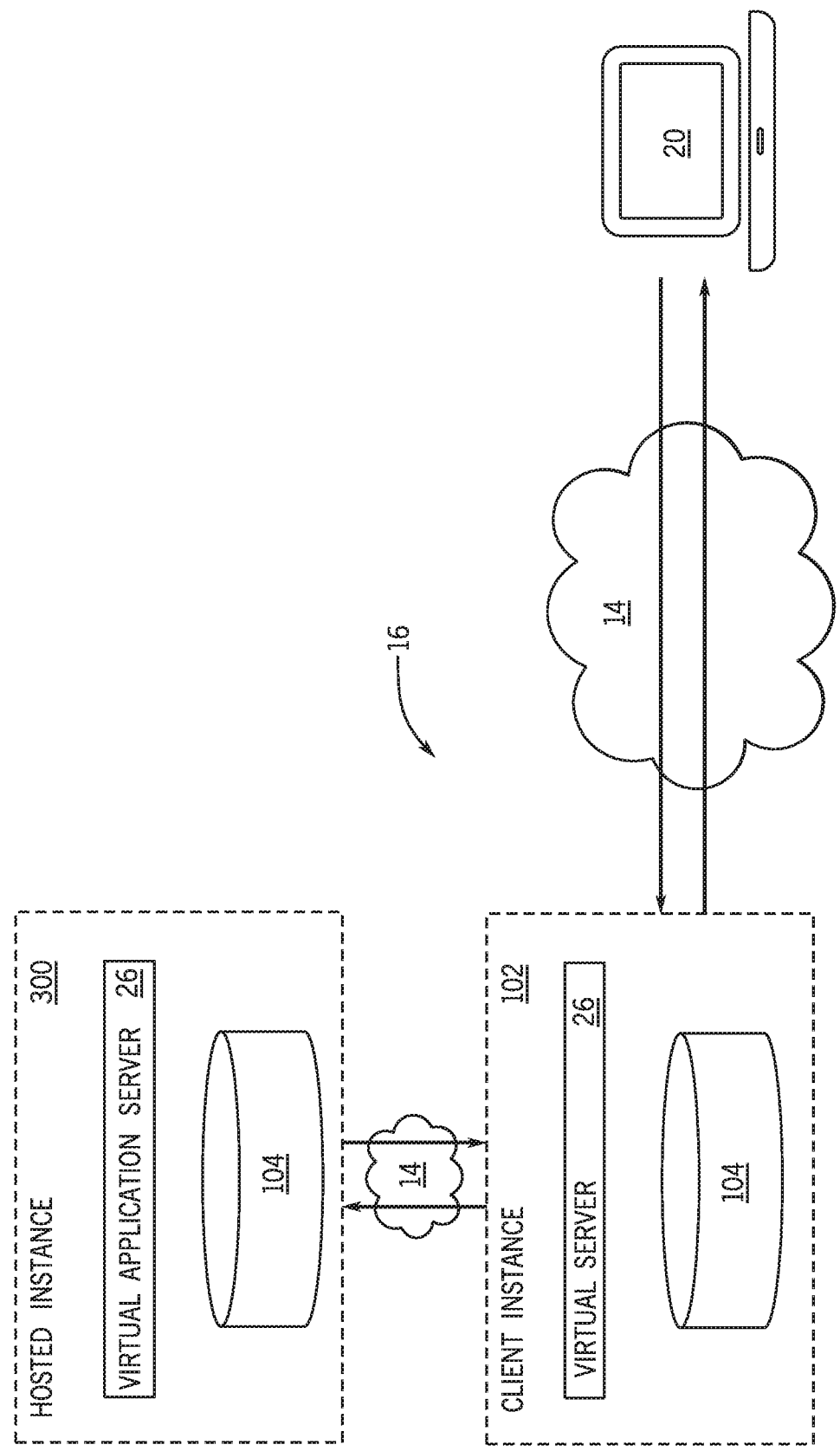
FIG. 4 is a block diagram illustrating an embodiment in which a virtual server supports and enables the client instance, in accordance with aspects of the present disclosure.

With the foregoing in mind, FIG. 4 is a block diagram illustrating an embodiment in which a virtual server 26 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20 via the network 14 to provide a user interface to network applications executing within the client instance 102 (e.g., via a web browser of the client device 20). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser. The client instance 102 may also be configured to communicate with other instances, such as a hosted instance, which may also include a virtual application server 26 and a virtual database server 104.

Figure 5:
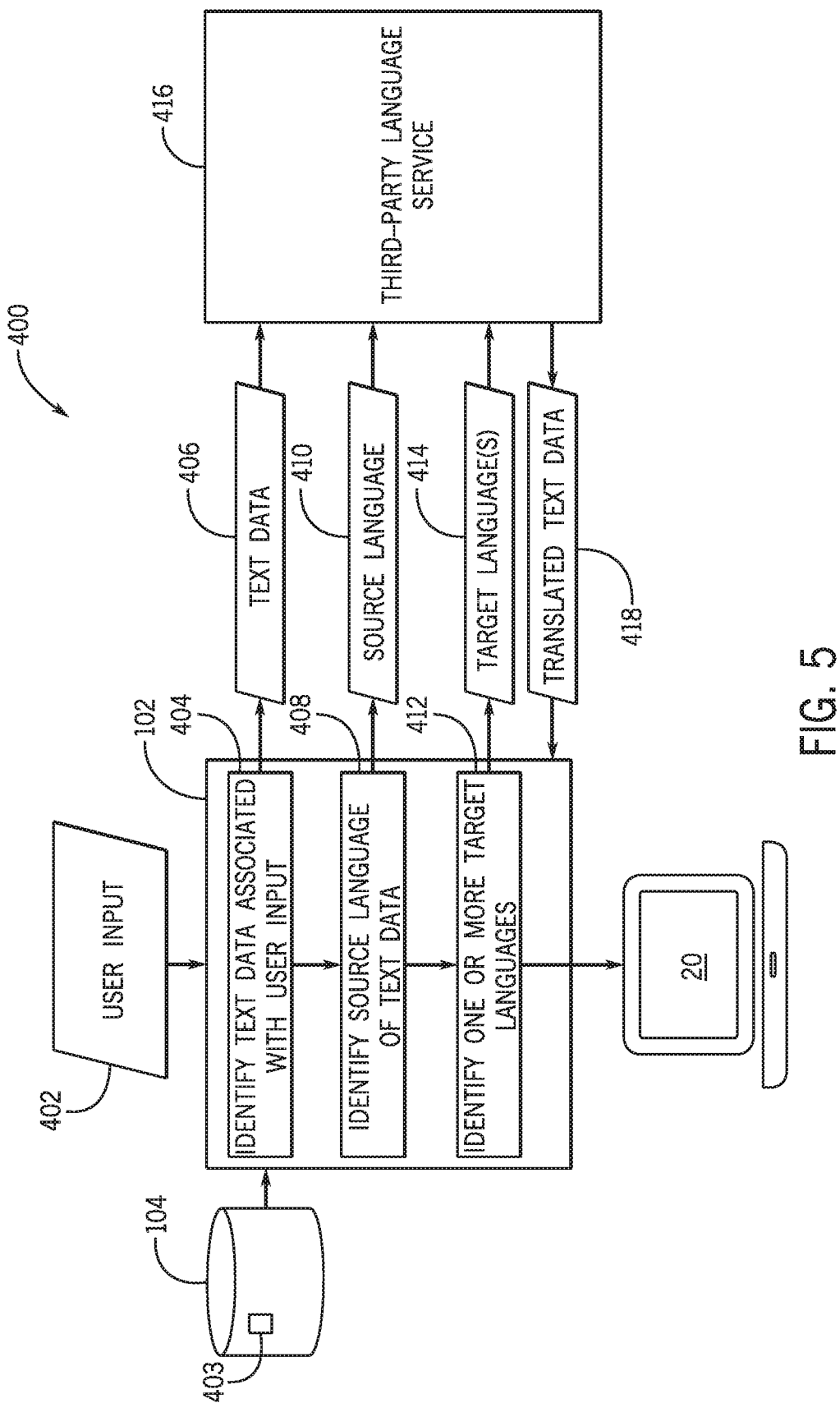
FIG. 5 is a diagram illustrating information flows for generating a translated asset, in accordance with aspects of the present disclosure.

FIG. 5 is an information flow diagram illustrating an embodiment of a process 400 for generating a translated message based on a received user input 402. The process 400 is merely an example, and in other embodiments, the process 400 may include additional steps, fewer steps, repeated steps, and so forth, in accordance with the present disclosure. It should be noted that at least some of these steps may be executed by a processor, such as processor 202, a processor of a client device (e.g., a mobile phone, laptop, tablet, and the like), or any suitable processor.

As shown in FIG. 5, the illustrated process 400 begins with the client instance 102 receiving a user input 402. In some embodiments, the user input 402 may be a text-based message transmitted by a user using a messaging application to converse with another user. For example, the message application may be an email, a message in a chat window, a field from a query, and the like.

In some embodiments, the user input 402 may be a query and/or request to retrieve a data file 403 stored in a database (e.g., database 104). Moreover, it should be noted that the query and/or request to retrieve the data file may be direct or indirect. That is, a direct request from a user may be a query with search terms for a particular type of file such as a video, such as a training video, and/or text-based documents. In some embodiments, the user input 402 may be a selection of a button to translate the video, which may generate subtitles that are displayed in a different language and/or overlayed with translated audio.

With regard to an indirect request, the client instance may determine that a file or an assemblage of files, such as a knowledge article, is relevant to an employee based on queries made by the user, lifecycle events, identity data of the user, the enterprise the user works for, and like. In some embodiments, audio and/or text associated with the video may be translated based on a determination that a language of a user (e.g., indicated by a locale, language preference, location of work, and the like) is different than the language of the video. In some embodiments, a user search for a video may result in a query of the audio transcript of the video to surface relevant videos, such as videos covering a similar subject matter but in the language of the user.

In some embodiments, the user input 402 may be audio data and/or transcribed audio data. In some embodiments, the user input 402 may be a video with/without ext data, such as subtitles. In some embodiments, the user input 402 is a request to translate text, such as text present in a form and/or field. In any case, the user input 402 is generally associated with text and or audio to be translated.

The process 400 also includes identifying (e.g., process block 404) text data 406 associated with the user input 402. In some embodiments, the user input 402 may include text data 406 that the user wants to translate. In some embodiments, a file (e.g., video containing audio files and/or text files, audio files, text-based documents, or any combination thereof) may be retrieved from a database (e.g., database 104) based on the user input, as discussed above. In some embodiments, identifying the text data 406 may include retrieving a library of vocabulary, abbreviates, synonyms, relevant jargon, and the like, from a database that may facilitate generating a translated text. Additionally or alternatively, in some embodiments, the text data 406 may be audio data.

Additionally, the process 400 includes identifying (e.g., process block 408) a source language 410 of the text data 406. In some embodiments, the source language 410 is identified based on a client device that transmitted the user input. For example, the source language 410 may be identified based on a locale associated with the client device, language preference indicated by a profile of a user using the client device, and/or meta data tagging a file that indicates the language of the file. That is, the user may have user settings that indicate a language preference, default language, country of residence, and the like. In some embodiments, the source language 410 may be received as input (e.g., included or sent in addition to the user input 402).

Further, the process 400 includes identifying (e.g., process block 412) a target language 414 of the text data 406. In some embodiments, the target language 414 of the text data 406 may be identified based on a client device 102 that provided the user input 402. It should be noted that multiple target languages may be identified in certain embodiments. In some embodiments, the target language 414 of the text data 406 may be identified based on a target device, such as a client device in communication with the client device that transmitted the user input 402, an intended recipient of the message, other users in a text-based chat room, and the like. In some embodiments, the target language 414 may be provided in the user input 402, such as when a user transmitting the user input 402 and/or message containing data.

As discussed herein, the client device 102 may use the text data 406, or generally data to be retrieved in response to the user input 402, the source language 410, and the target language 414 to output a translated message 418. It should be noted that the client device 102 may make a determination to produce a translated message via a third-party language service based on a determination that a source language associated with a requested file differs from a target language associated with the user. Further, it should be noted, that the determination may be applied to files retrieved via direct and/or indirect requests for files. As discussed herein, it should be noted that multiple translated messages 418 may be outputted, and each of the multiple translated messages 418 may have a different language.

In any case, as shown in the illustrated process 400, the client device 102 may output the text data 406, the source language 410, and the target language 414 to the third-party translation service. In some embodiments, as discussed above, the client device 102 may only output the text data 406 and the target language 414, such as when the third-party translation service 416 can determine a source language of the text data and/or the user input 402 without the client device 102 providing the source language. In general, the third-party translation service may be any suitable software that is capable of translating text and/or transcribing audio to text before translating the transcribed text. In some embodiments, the user input 402 may include a request, choose, or select a certain third-party translation service. Additionally or alternatively, the third-party translation service may be chosen based on performance data (e.g., stored in a database 104) associated with the quality of the third-party translation service for a particular language. In any case, the client instance 102 may output the text data 406, the source language 410, and the target language 414 to the requested third-party translation service. Subsequently, the client device 102 or other devices, may receive a translated message 418 based on the text data 406, the source language 410, and the target language 414 from the third-party translation service.

In some embodiments, the client instance 102 may output the translated message 418 to a client device 20 where a user, such as a reviewer or other verifier, may verify the quality of the translated message 418. For example, the reviewer may be an employee tasked with reading the translating message 418 and determining whether or not the translated message 418 is above a threshold quality. As such, if the reviewer determines that the translated message is below a threshold, or of an insufficient quality, the reviewer may send a request that the text data 406, the source language 410, and the target language 414 be sent to a different third-party translation service. In some embodiments, the reviewer may correct the translated message manually. In some embodiments, the reviewer may correct the translated message 418 and subsequently provide an indication that the corrected translated message is above a threshold quality. As such, the corrected translated message may be outputted to the client device 20 that sent the user input 402 and/or another client device 20 utilized by a user that was the intended recipient of the translated message 418. In some embodiments, the reviewer may provide an indication that the translated message 418 is approved (e.g., above a quality threshold). As such, the reviewer may provide an indication that the translated message 418 be sent to the recipient of the message and/or uploaded to the database 104 for later use.

Figure 6:
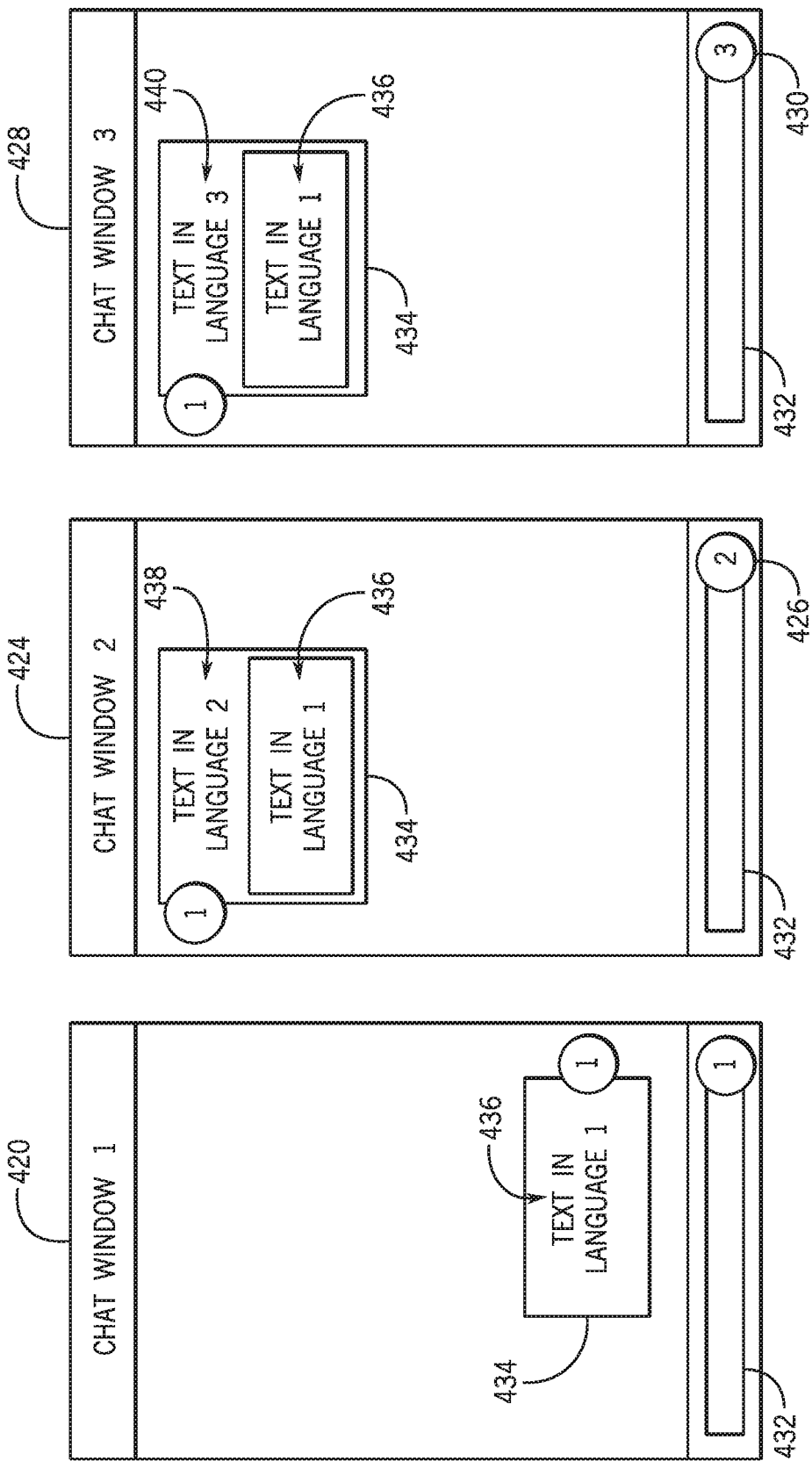
FIG. 6 shows windows displaying a text-based communication between multiple users, in accordance with aspects of the present disclosure.

As discussed above, the user input 402 shown in FIG. 5 may be from a text-based communication between users. FIG. 6 illustrates an example of multiple users communicating via a text-based chat service, where each user speaks a different language. In particular, FIG. 6 illustrates a first window 420 that may be displayed on a client device 20 used by a first user 422, a second window 424 that may be displayed on a client device 20 used by a second user 426, and a third window 428 that may be displayed on a client device 20 used by a third user 430. While only three users are discussed, it should be noted that the techinques discussed herein may be application to any number of users in the text-based chat service.

As shown in FIG. 6, each window 420, 424, and 428 includes a text input field 432 and a text display window 434. In this example, the first user 422 has submitted a text via the text input field 432, which is shown displayed in the text display window 434 of the first window 420, the text display window 434 of the second window 424, and the text display window 434 of the third window 428. In particular, the text display window 434 of the first window 420 includes text 436 that is displayed in a first language associated with a source language of the first user. As discussed herein, in response to the first user 422 inputting or confirming submission of text in the field 432, the client device may translate the text to a respective language for one or more recipients. That is, a source language of the text 436 may be determined based on an identity of the first user 422, such as a locale, language preferences, an input indicative of the first user's language, and the like. Further, one or more target languages may be determined based on an identity of the recipients (i.e., the second user 426 and the third user 430).

Accordingly, the text display window 424 of the second window 425 displays a first translated text 438 (e.g., the text 436 translated into the language associated with the second user 426 accessing a client device displaying the window 424) as well as the original text 436 (e.g., untranslated text in the source language). In some embodiments, the text window 428 may only display a message or text in the language associated with the client device displaying the window. Furthermore, the text display window 434 of the third window 428 displays a second translated text 440 (e.g., the text 436 translated into the language associated with the third user 430 accessing the client device displaying the window 424). In this manner, employees of an enterprise using a text-based communication software may dynamically communicate with one another despite speaking different languages and/or having different language preferences.

Figure 7:
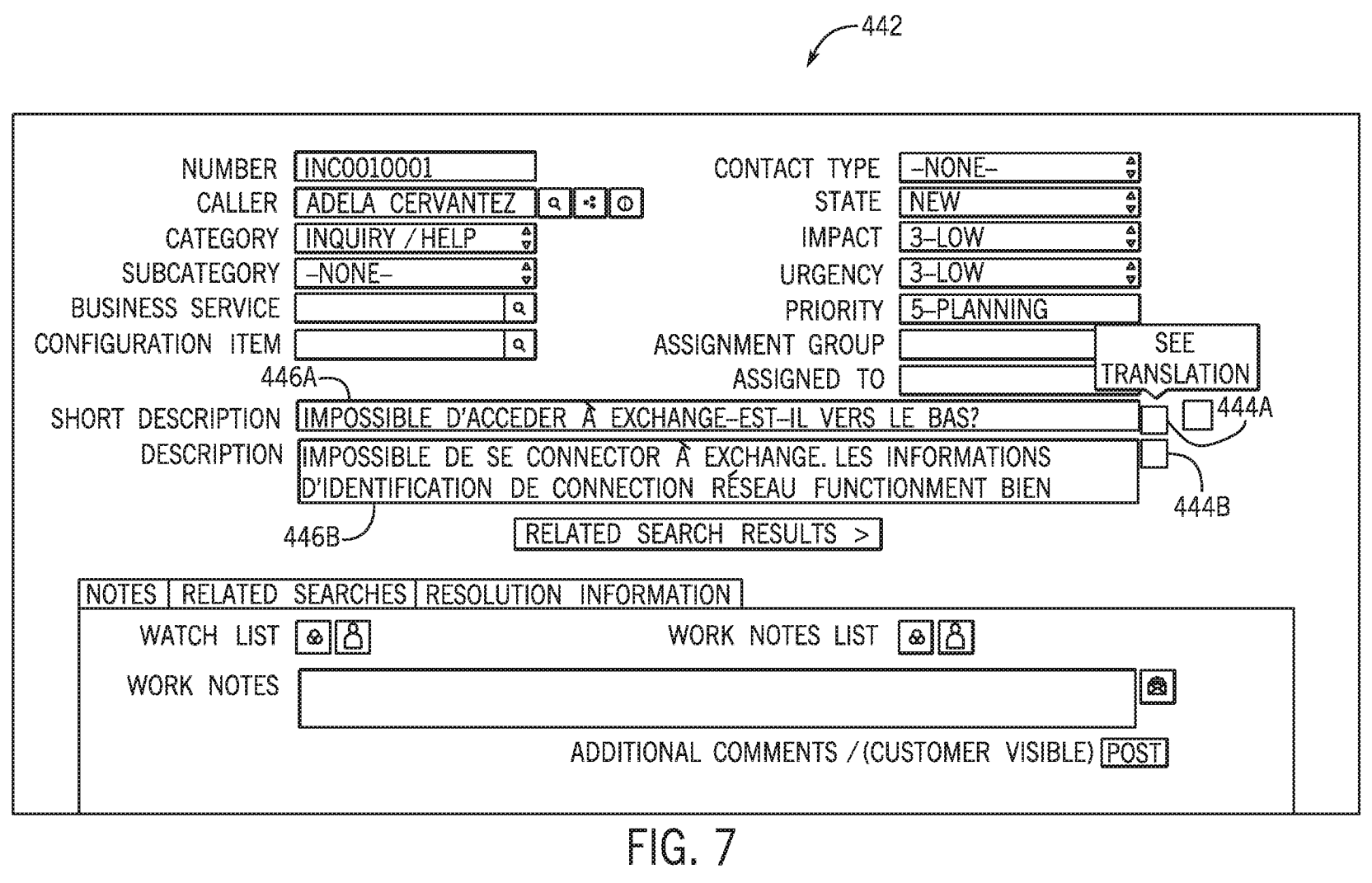
Figure 8:
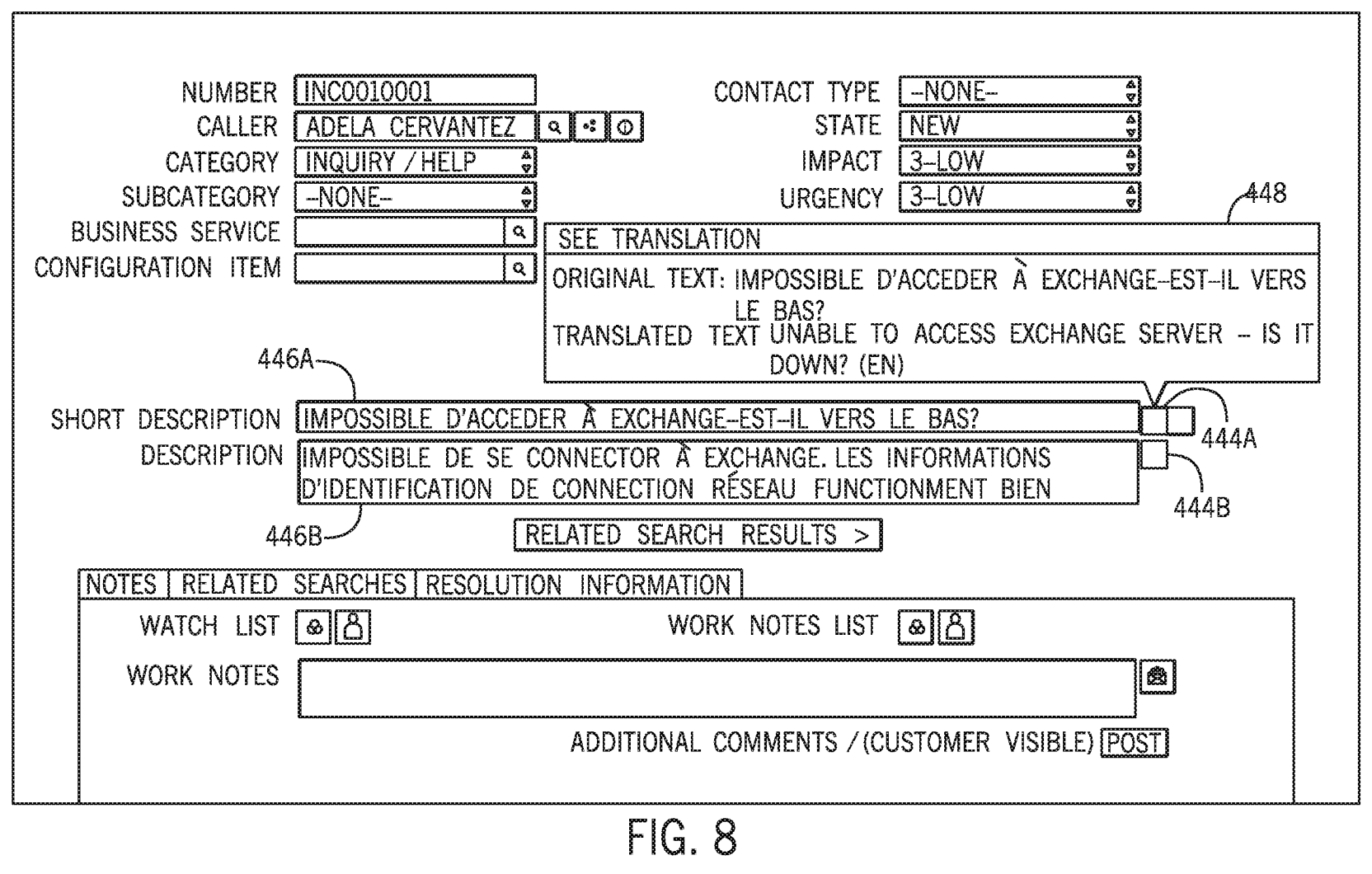

As a further non-limiting example of the techniques described herein, FIG. 7 shows a screenshot displaying a form 442 that includes actionable content 444 that may trigger a translation of text input into associated fields 446. For example, a user selecting the actionable content 444*a* may trigger a translation of text in the field 446*a*. Similarly, a user selecting the actionable content 444*b* may trigger translation of text in the fields 446*b*. To illustrate this, FIG. 8 shows a translation display window 448 that may be displayed in response to selection of one of the actionable content 444 associated with the fields 446. The target language of the text in the fields 446 may be determined based on, for example, the language of a recipient of the form 442, such as a customer service agent. As discussed herein, the source language of the text in the fields 446 may be determined based on identity data, such as a locale or preferred language of the user using the form 442. In some embodiments, the actionable content 444 may be integrated into existing software having text fields. In this manner, the present techniques may facilitate communication between users, such as an employee or a customer, and a customer service agent, speaking different languages during activities related to the enterprise.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a client instance hosted by one or more data centers, wherein the client instance is accessible by one or more remote client networks, wherein the system is configured to perform operations comprising:
receiving a request for a file from a client device;
determining that the file comprises an untranslated file based on a comparison between a source language associated with the file and one or more target languages associated with the client device in response to receiving the request for the file, wherein the source language and the one or more target languages are each a respective spoken language;
generating a translation request in response to determining that the source language does not match at least one target language of the one or more target languages, wherein the translation request is associated with an untranslated file and the one or more target languages;
outputting the untranslated file and at least one respective target language of the one or more target languages to a third party translation service; and
receiving a translated file based on the at least one respective target language, the untranslated file and a source language of the untranslated file.

2. The system of claim 1, wherein the untranslated file is text from a text-based communication service and wherein the translated file comprises translated text; and
wherein the operations comprises:
outputting the translated file to an additional client device.

3. The system of claim 2, wherein the operations comprises:
outputting the text from the text-based communication service in addition to the translated file.

4. The system of claim 1, wherein the untranslated file comprises audio data and wherein the translated file comprises translated audio data.

5. The system of claim 1, wherein the translation request comprises a request for an untranslated file stored in a database accessible by the client instance.

6. The system of claim 1, wherein the one or more target languages is a plurality of target languages and the translated file is a plurality of translated files associated with a respective target language of the plurality of target languages.

7. The system of claim 1, wherein the operations comprise:
identifying a recipient of the untranslated file; and
identifying the target language based on identity data of the recipient.

8. The system of claim 1, wherein the translated file is a translated video comprising subtitles based on the target language and the source language.

9. The system of claim 1, wherein the translation request is received based on a user input indicative of a selection of actionable content displayed on a form.

10. The system of claim 1, wherein the source language of the untranslated file is identified based on identity data associated with a user.

11. A system, comprising:
a client instance hosted by one or more data centers, wherein the client instance is accessible by one or more remote client networks, wherein the system is configured to perform operations comprising:
retrieving a file from a database assessable by the client instance in response to an input sent by a user via a client device, wherein the file comprises a source language and text data, audio data, or both;
identifying a target language based on identity data associated with the user in response to retrieving the file, wherein the target language is a spoken language;
determining whether the target language matches the source language in response to identifying the target language;
outputting the file, the source language of the file, and the target language to a third-party translation service to generated a translated file in response to determining that the target language does not match the source language; and receiving the translated file and outputting the translated file to the user.

12. The system of claim 11, wherein the operations comprise:

receiving an additional input indicative of a selected third-party translation service; and wherein the third-party translation service is the selected third party translation service.

13. The system of claim 11, where the file is a video file comprising audio data, text data, or both.

14. The system of claim 11, wherein the identity data comprises a preferred language indicated on an account associated with the user.

15. The system of claim 11, wherein a translation quality of the translated file is verified by a reviewer before the translated file is outputted to the user.

16. A method, comprising:

retrieving a file stored in a database based on query made by a user;

identifying a source language of the file and a target language associated with the user in response to retrieving the file, wherein the target language is determined based on identity data associated with the user, and wherein the source language and the target language are spoken languages;

determining whether the target languages matches the source language;

outputting the file, the source language, and the target language to a third-party translation service to generate a translated file in response to determining that the source language of the file does not match the target language associated with the user;

receiving a translated file based on the target language, the untranslated file and a source language of the untranslated file.

17. The method of claim 16, wherein the file is in retrieved in response to an indirect request for the file by the user.

18. The method of claim 16, wherein the translated file is an assembled document comprising one or more knowledge blocks present in each language of the one or more target languages.

19. The method of claim 16, wherein the third-party translation service is chosen based on a performance metric of the third-party translation associated with the source language, the target language, or both.

* * * * *